United States Patent [19]

Meshkat et al.

[11] Patent Number: 5,214,752
[45] Date of Patent: May 25, 1993

[54] POINT PLACEMENT METHOD FOR USE IN A THREE-DIMENSIONAL AUTOMATIC MESH GENERATION SYSTEM

[75] Inventors: Siavash N. Meshkat, San Jose; James M. Ruppert, Berkeley, both of Calif.

[73] Assignee: International Business Machines Corporation, Armonk, N.Y.

[21] Appl. No.: 644,162

[22] Filed: Jan. 22, 1991

[51] Int. Cl.$^5$ ............................................. G06F 15/72
[52] U.S. Cl. .................................................... 395/123
[58] Field of Search ........................ 364/578; 395/123

[56] References Cited

U.S. PATENT DOCUMENTS

| | | | |
|---|---|---|---|
| 4,829,446 | 5/1989 | Draney | 364/488 |
| 4,888,713 | 12/1989 | Falk | 364/522 |
| 4,912,664 | 3/1990 | Weiss et al. | 364/577 |
| 4,930,092 | 5/1990 | Reilly | 364/522 |
| 4,933,889 | 6/1990 | Meshkat et al. | 364/578 |
| 4,941,114 | 7/1990 | Shigyo et al. | 395/123 X |

OTHER PUBLICATIONS

K. Koyamada, Method to Reconstruct Solid Elements Into Linear Tetrahedral Elements, vol. 32, No. 1 Jun. 1989, pp. 340–342., IBM Tech. Disclosure Bulletin.
D. E. Schreiber, Computing a Set of Triangular Plates which Represent a Potential Surface of a Scaler Function Defined at the Vertices of a Three Dimensional.
Cavendish et al., Approach to Automatic Three-Dimensional Finite Element Mesh Generation, National Journal for Numerical Methods in Engineering, vol. 21, 329–347 (1985).
William H. Frey, Selective Refinement: A New Strategy for Automatic Node Placement in Graded Triangular Meshes, International Journal for Numerical Methods in Engineering, vol. 24 2183-2200.
W. J. Schoeder Geometry-Based Fully Automatic Mesh Generation and the Delaunay Triangulation, Intl. Journ. For Numerical Methods in Engineering, vol. 26 2503–2515 (1988).
David A. Field, Implementing Watson's Algorithm in Three Dimensions, 1986 246–259, General Motors Research Laboratories.
Cendes et al., Magnetic Field Computation Using Delaunay Trianguation and Complementary Finite Element Methods, IEEE Transactions on Magnetics, vol. Mag. No. 6 Nov. 1983 pp. 2551–2554.
Yerry et al., Automatic Three-Dimentional Mesh Generation by the Modified-Octree Technique, Int'l. Jour. For Numerical Methods in Engineering, vol. 20 1965-1990.

*Primary Examiner*—Mark K. Zimmerman
*Attorney, Agent, or Firm*—Perman & Green

[57] ABSTRACT

A method for producing a set of points for a mesh of finite elements for a body to be analyzed, the body exhibiting boundaries and faces. The method comprises the steps of: producing an initial mesh of elements for the body, each element having a plurality of vertices and edges; for each vertex in a first subset of the vertices, finding points of intersection (POI) between a sphere of radius R, centered at a vertex being considered, and the boundaries and edges; determining if a found POI is either on or within the boundaries of the body and exhibits more than a minimum clearance distance from the boundaries, and vertices, any such POI being classified as a selected POI; inserting a selected POI in the initial mesh; and repeating the aforementioned steps for all POI's in the first subset and then proceeding to succeeding subsets of vertices until all POI's in all subsets have been considered.

12 Claims, 6 Drawing Sheets

SLIVER REMOVAL

POINT PLACEMENT METHOD FOR USE IN A THREE-DIMENSIONAL AUTOMATIC MESH GENERATION SYSTEM

FIELD OF THE INVENTION

This invention relates to computer modelling of an object through the use of finite element analysis and, more particularly, to the generation of finite elements using an improved mesh generation method.

BACKGROUND OF THE INVENTION

Finite element analysis is a widely used computer-aided design tool for solving engineering problems governed by partial differential equations. Such problems analyze the effects on a body of heat transfer flow, stress, vibration, fluid flow etc. Finite element analysis is particularly important when the shape of a body to be modelled is relatively complex, since the differential equations for such applications become increasingly difficult to solve or even to approximate.

An initial stage of a finite element analysis involves the creation of a mesh of points that are interconnected and become vertices of finite elements, both on the surface of the body and, in 3-D, in its interior. Accurate finite element analysis requires that a point placement method be employed which yields a mesh that satisfies at least four criteria: (1) the overall point or vertex density is able to be specified; (2) the density of vertices should increase in critical regions, (i.e., those which have small features and concave corners); (3) "skinny" finite elements are to be avoided; and (4) a mesh derived from a set of vertices should be able to be refined in certain areas by the user or the finite element analysis solving algorithm.

In the prior art, the generation of a 3-D mesh suitable for finite element analysis has been one of the most time consuming steps in using the computer to analyze a complex engineering problem. Most previous work on 3-dimensional point placement has been heuristic in nature. Many approaches have required significant manual interaction between the user and the point placement map and subsequent manual corrections of the output.

In the scientific literature, considerable attention has been paid to methods for generating meshes for use in finite element analysis. Three papers appearing in the International Journal for Numerical Methods and Engineering consider various applications of Delaunay triangulation and the generation of a mesh therefor. Those papers are as follows: Cavendish et al., Vol. 21, pp. 329-347, (1985); Frey, Vol. 24, pp. 2183-2200 (1987); and Schroeder et al., Vol. 26, pp. 2503-2515 (1988). Each of the aforementioned articles employs a teaching of Delaunay to achieve planar triangulation and three-dimensional tetrahedrization. A tetrahedral mesh is said to be a "Delaunay tetrahedrization" if the following is true for each tetrahedron in the mesh: the sphere defined by the four vertices of the tetrahedron, called its circumsphere, contains no mesh vertices in its interior. Vertices on the circumsphere's boundary are permitted.

The same property applies to two-dimensional surfaces. Given a three vertex triangulation if and only if a circle defined by the three vertices contains no other vertices in its interior, is the triangulation defined as a Delaunay triangulation. Cavendish et al. implements such a triangulation by rejecting from the set of all possible triangles which might be formed, those with non-empty associated circles. Those triangles not rejected, form the Delaunay triangulation. Frey employs a similar triangulation scheme and further teaches a method for selective refinement of an initial triangulation. Grading of the mesh is controlled by a node spacing function wherein a respective node is inserted and its spacing from adjacent nodes is evaluated. Each new prospective node is also tested to see if its insertion would lead to a Delaunay triangulation with an acceptable degree of spacing at the new node.

Schroeder et al. apply those teachings to three-dimensional surfaces.

Further references which discuss methods for mesh generation can be found in the following: Yerry et al., International Journal for Numerical Methods and Engineering, Vol. 20, pp. 1965-1990 (1984); Cendes et al., IEEE Transactions on Magnetics, Vol. Mag-19, No. 6, pp. 2551-2554 (1983); Field, "Second International Symposium on Computational Geometry", pp. 246-259 (1986); Schrieber, IBM Technical Disclosure Bulletin, Vol. 18, No. 4, pp. 1163-1176 (1975) and Koyamada, IBM Technical Disclosure Bulletin, Vol. 32, No. 1, pp. 340-342 (1989).

In U.S. Pat. No. 4,912,664 to Weiss et al., a 2-D approach to generating a mesh using Delaunay triangulation is described. Weiss et al. employ an expert-system based point placement algorithm and an element of "goodness" criterion for point selection. Weiss et al. teach that points are placed in a 2-D mesh until all resulting elements meet a goodness criteria.

In U.S. Pat. No. 4,933,889 to Meshkat et al., a further 2-D approach for generating a mesh using symmetric axis decomposition is disclosed. The method taught therein is not point based, but does employ the symmetric axis of a body to enable finite elements to be calculated.

Mesh generation has also been employed to enable the rendering of three-dimensional displays of various bodies. Description of representative systems for enabling such displays may be found in the following patents: Falk, U.S. Pat. No. 4,888,713; Reilly, U.S. Pat. No. 4,930,092 and Draney, U.S. Pat. No. 4,829,446.

It is an object of this invention to provide an improved point placement method for use in a three-dimensional, automatic mesh generation algorithm.

It is another object of this invention to provide an automated point placement method wherein mesh grading and mesh refinement are automatically controlled.

It is still another object of this invention to provide a point placement method wherein point density is controlled automatically.

It is still a further object of this invention to provide an improved point placement method which prevents badly shaped mesh elements from appearing in the resulting mesh.

SUMMARY OF THE INVENTION

A method is described for producing a set of points for a mesh of finite elements for a body to be analyzed, the body exhibiting boundaries and faces. The method comprises the steps of: producing an initial mesh of elements for the body, each element having a plurality of vertices and edges; for each vertex in a first subset of the vertices, finding points of intersection (POI) between a sphere of radius R, centered at a vertex being considered, and the boundaries and edges; determining if a found POI is either on or within the boundaries of the body and exhibits more than a minimum clearance distance from the boundaries, and vertices, any such POI being classified as a selected POI; inserting a selected POI in the initial mesh; and repeating the aforementioned steps for all POI's in the first subset and then proceeding to succeeding subsets of vertices until all POI's in all subsets have been considered.

DETAILED DESCRIPTION OF THE INVENTION

Figure 1:
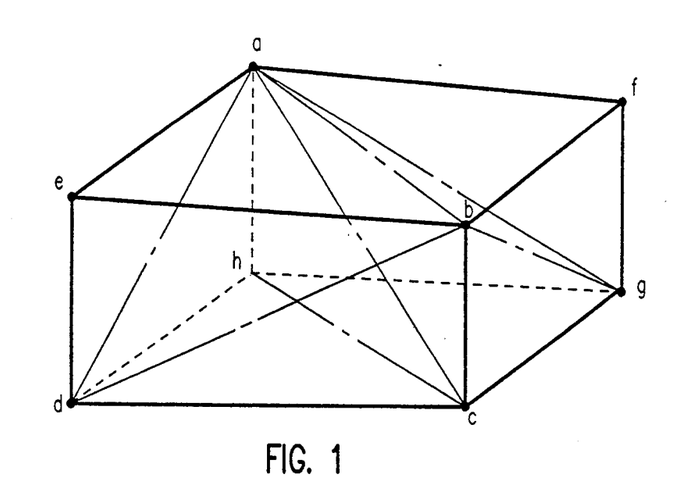
FIG. 1 is a perspective view of a three-dimensional object after it has been subjected to a Delaunay tetrahedrization.
Figure 2:
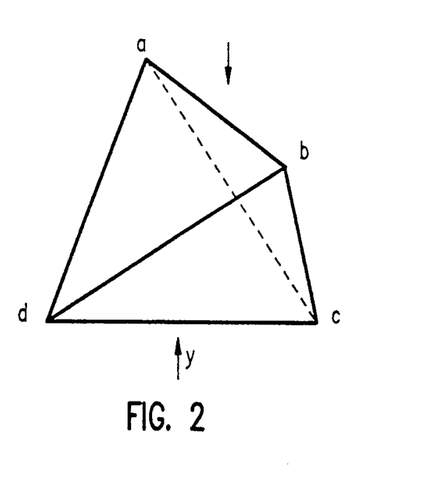
FIG. 2 is a perspective view of a tetrahedron found in FIG. 1.

Referring to FIG. 1, a simple solid having vertices a,b,c,d,e,f,g, and h is shown after it has been subjected to a Delaunay tetrahedrization. In FIG. 2, one of tetrahedra contained within FIG. 1 is shown and comprises vertices A, B, C, and D. As is known to those skilled in the art, any tetrahedron constructed in accordance with the Delaunay principle may be contained within a circumsphere, which circumsphere contains no mesh vertices in its interior. During the initial Delaunay tetrahedrization, a circumsphere for each tetrahedron is derived and its equation is stored.

The derivation of an initial tetrahedrization requires coordinate values for each of the vertices of the body and its boundaries be inputted by the user. As can be seen from FIG. 3, (box 20), those values are also employed by the method of this invention. Thus, the inputs for the method comprise: the vertices of a model of the body being analyzed, the boundaries of the model and an initial Delaunay tetrahedrization of the model including calculated circumspheres. In addition, certain parameters are either provided or may be calculated. For instance, in the method of this invention, each vertex has a sphere constructed about it, with the vertex serving as the center. The radius of the sphere is set at a value R. The value of R may be either inputted by the user or, as a default value, be based upon the smallest feature size of the model (e.g., the minimum distance between two non-incident vertices, edges or faces). The idea is that the smallest feature gets broken up to some number of finite elements. To determine the smallest feature of a three-dimensional object, the minimum of the following quantities may be selected: the minimum distance of any vertex-to-vertex pair; the minimum distance of any vertex-face pair where the face does not contain the vertex; or the minimum distance of any edge-edge pair, where the two edges are not incident.

Growth factor (G) is another input parameter and is a number which is multiplied by the current radius value R at each round of consideration of vertices. The growth factor determines how fast the increase in mesh size occurs. The value of the growth factor is always at least "1" and thus determines the spacing of the points that are placed during the method which placement, in turn, controls the grading of the mesh. A large value of growth factor will mean that the finite element sizes will change rapidly as the mesh is processed, while a value of 1.0 means that the points will be evenly spaced throughout the object thereby producing a uniform mesh.

A parameter "clearance factor" is a value between 0 and 1 which is used to help control the shapes of the elements created by the tetrahedrization. Any candidate vertex is rejected if it is so close to a vertex that a sphere, centered at the latter vertex and having a clearance factor radius, contains the candidate vertex.

Figure 3:
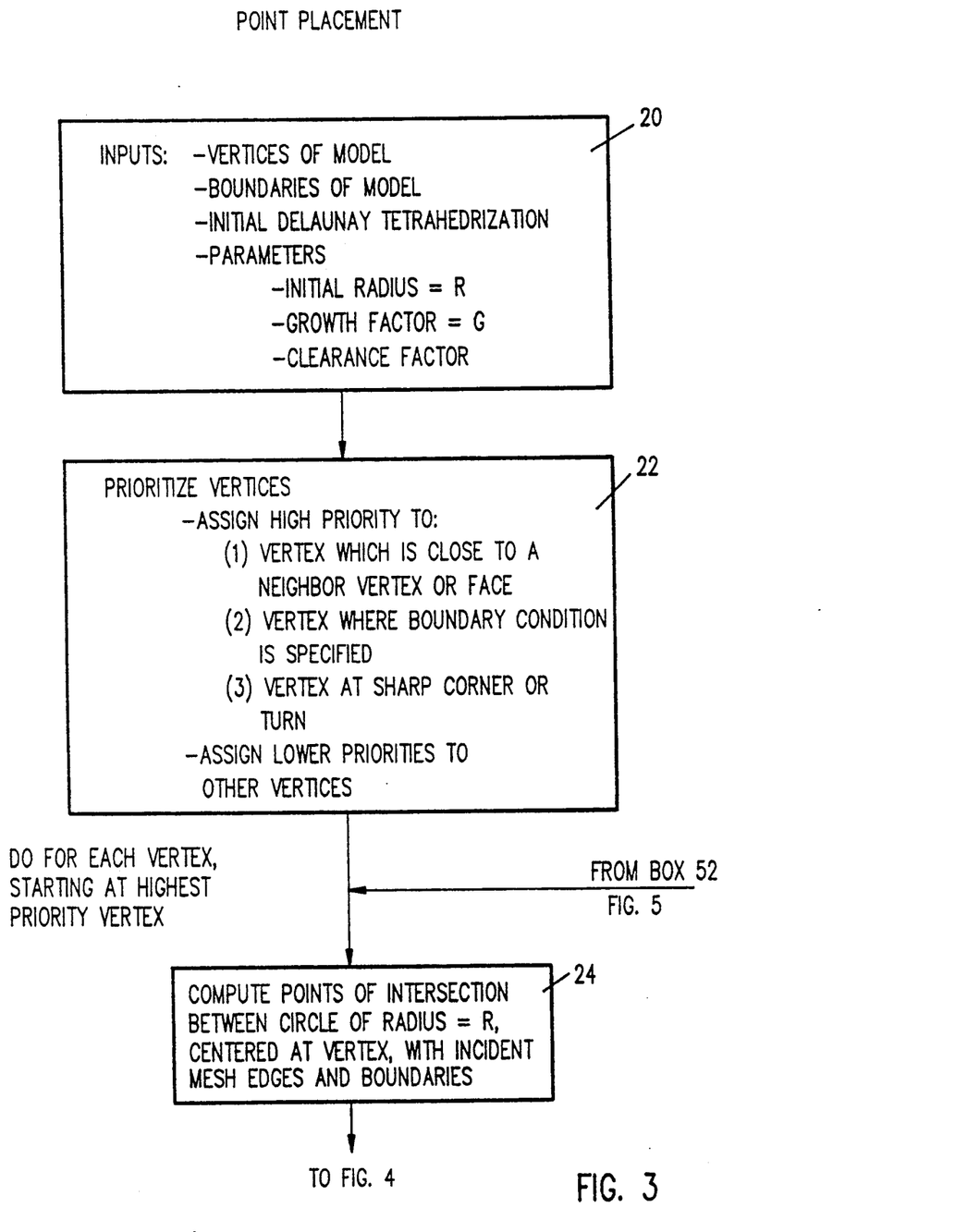
FIGS. 3–5 illustrate a high level flow diagram describing the method of the invention.

As shown in box 22 in FIG. 3, the program first prioritizes the vertices. Vertex priorities control the point placement process during succeeding steps of the method. The priorities determine when a vertex is considered and the intention is that the "most critical" vertices are activated early and are surrounded by more densely placed points to enable a more precise analysis in a subsequent finite analysis. The criticality of vertices can be somewhat subjective and can depend upon local geometry of the model, results of previous finite element analyses or knowledge of the user about the type of analysis to be done. Certain selected standards for priority assignment are indicated in box 22.

Initially, a set of priorities is selected, e.g., 1–5, with priority 1 being the highest and 5 being lowest. A highest priority is assigned to any vertex which is close to a neighboring vertex, e g , as determined by the clearance factor or by an incremented value of the clearance factor. Likewise, a highest priority is assigned to a vertex which is positioned where a boundary condition for the model is specified. Also, any vertex at a sharp corner or turn will generally have the highest priority assigned to it. Other vertices will have lower priorities assigned, those priorities being determined based upon the specific problem being addressed.

The assignment of vertex priorities makes adaptive mesh refinement possible. For example, if a mesh is run through a finite element analysis, and fails to converge around some vertex, the point placement algorithm (to be discussed below), can be re-run automatically, with that vertex given a higher priority.

Once priorities have been assigned to all vertices of the initial tetrahedrization, the program proceeds to box 24 where it proceeds to consider each vertex, starting with a vertex from the set of vertices having a highest assigned priority. Once such high priority vertex is selected, a sphere of radius R, centered on the selected vertex, is determined and the intersections of its surface are calculated with mesh edges and boundaries incident to the vertex. This operation can be visualized by referring to FIGS. 6 and 7.

Figure 6:
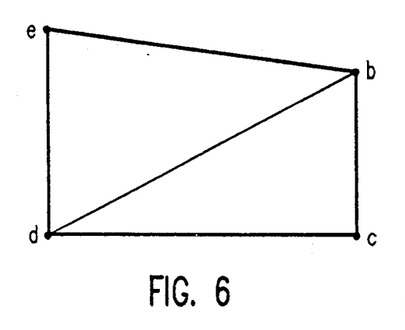
FIG. 6 indicates a face of the body of FIG. 1, showing an initial Delaunay triangularization thereof.
Figure 7:
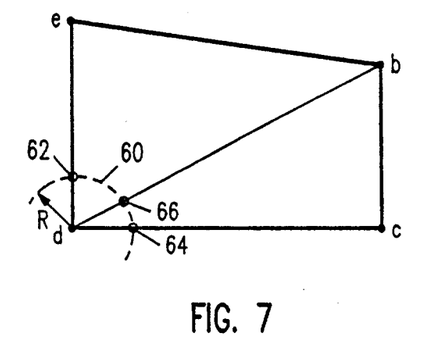
FIG. 7 shows the construction of a circle of radius R about a high priority vertex.

In FIG. 6, (for simplicity's sake) a plan view is shown of face bcde of the body of FIG. 1. Chord db is an edge of tetrahedron abcd that appears in face bcde. In FIG. 7, it is assumed that vertex d has highest priority and is the first vertex to be considered. A sphere 60, having a radius R (where R equals the initial radius parameter described above), is constructed using vertex d as the centerpoint. Intersection points between surface 60 and boundaries 62 and 64 and mesh edge 66 are then determined. At this point, each of POI's 62, 64, and 66 become candidates for insertion into the initial tetrahedron mesh shown in FIG. 1.

Figure 4:
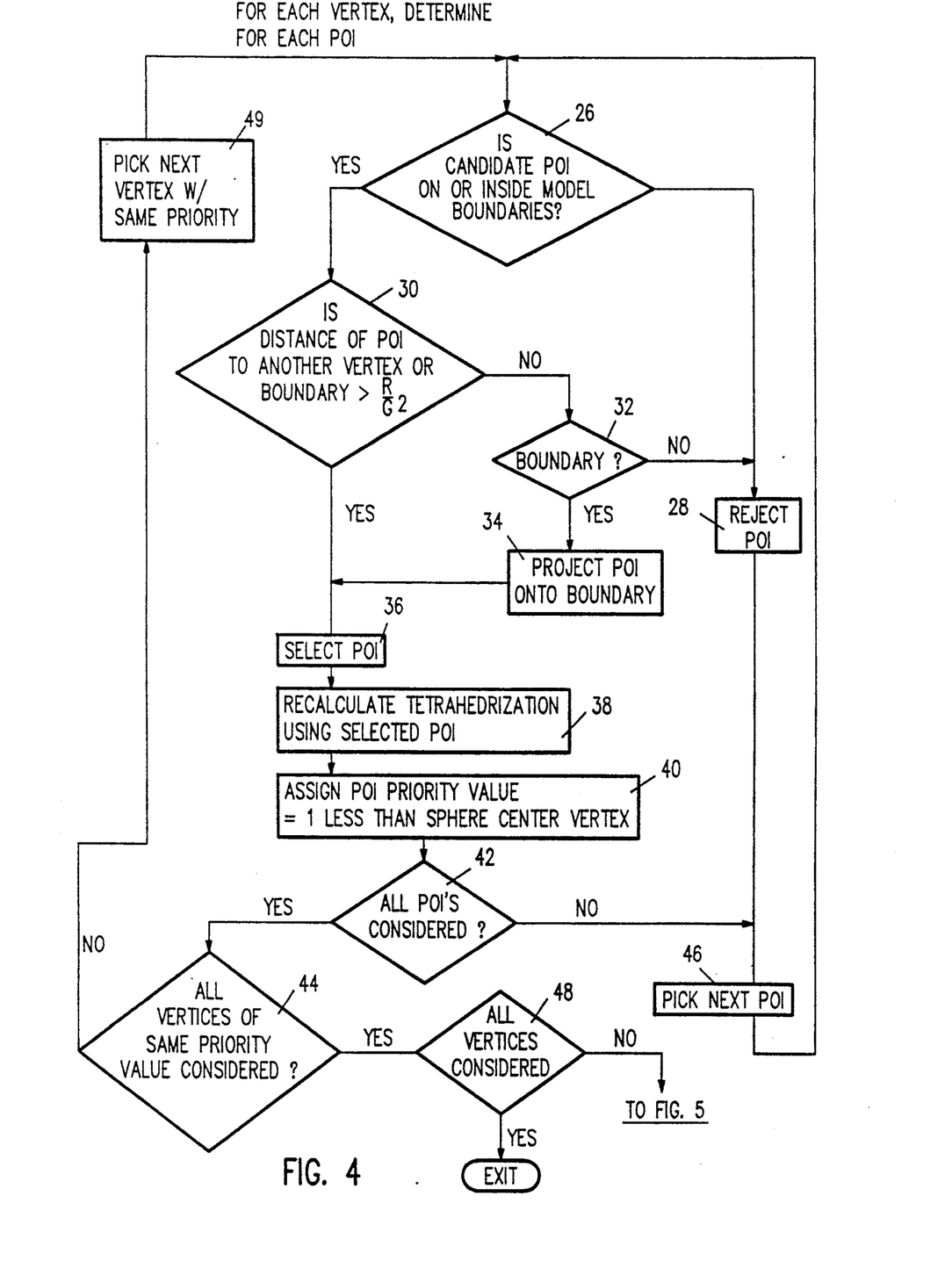
Figure 5:
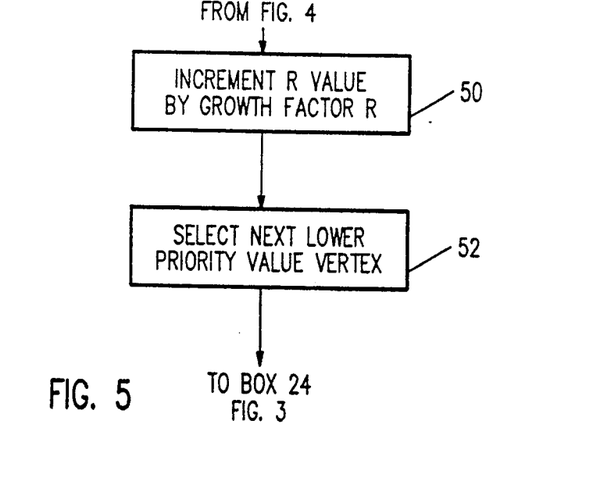

The method proceeds to consider each of POI's 62, 64, and 66 to determine if any is to be selected for insertion into the mesh. As shown in FIG. 4, the initial test (box 26) is whether a candidate POI is on or inside the model's boundaries. It can be seen that each of POI's 62, 64, and 66 fulfills this criteria. If any POI is found which does not fulfil that criteria, it is rejected and a new candidate POI is selected. It will be seen, as hereinbelow described, that each POI is considered individually and subjected to a number of tests before a new POI is considered. Nevertheless, points 62, 64, and 66 will be considered together during the description of flow diagram of FIGS. 4 and 5.

The next test to which a POI is subjected is whether its clearance distance from another point or boundary is less than a threshold. A threshold value may be set at any selected level, but it is preferred that the default value be equal to the value of the initial radius R, divided by the growth factor G squared. If the candidate POI does not pass this test, then it is too close to another POI and is not inserted into the mesh. There is however one exception and that is if the POI is found to not meet the threshold value by virtue of being too close to a boundary (box 32). If that is the case, then the point is projected onto the boundary (box 34) and becomes a selected point. Otherwise, the POI is rejected.

Figure 8:
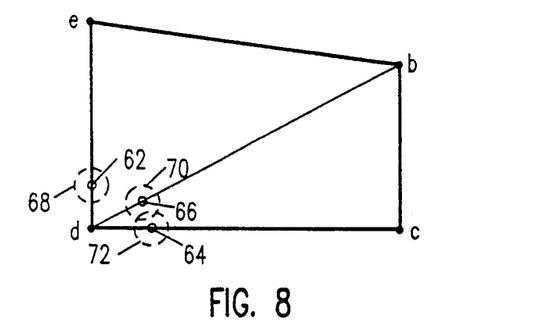
FIGS. 8 and 9 show how the distance between adjacent POI's is determined.
Figure 9:
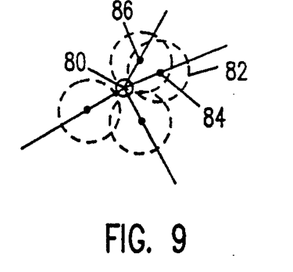

These steps are illustrated in FIGS. 8-11. In FIG. 8, a sphere 68, 70, 72 is calculated for each of POI's 62, 64, and 66 respectively, with the radius of each sphere equal to the initial clearance factor parameter. It can be seen that none of spheres 68, 70 and 72 contains other than a single POI so, for the construct shown in FIG. 8, all of points 62, 66, and 64 will pass the test indicated in box 30, FIG. 4. Turning, however, to FIG. 9, another vertex 80 is shown having a plurality of adjacent POI's. There, it can be seen that that sphere 82, constructed about POI 84, encompasses POI 86 and vice-versa. As a result, POI 86 will not be selected as a candidate for insertion into the mesh.

Returning to FIG. 8, since each of POI's 62, 64, and 66 pass the test indicated in box 30, a new tetrahedrization is calculated based upon insertion of a selected POI (boxes 36 and 38). Results of those steps are shown in FIG. 10 and show the new mesh edges which are added to connect newly inserted mesh points.

Figure 10:
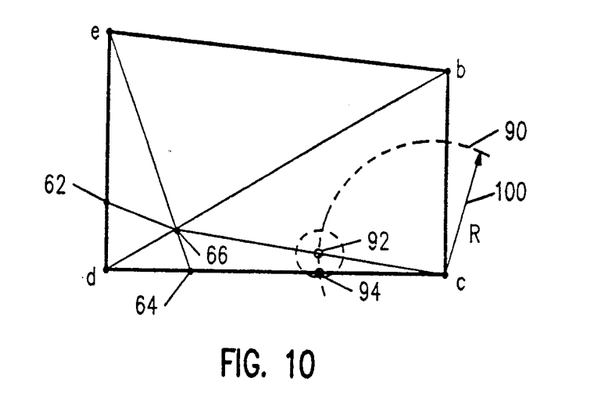
FIG. 10 illustrates how POI's are found for a vertex of lower priority.
Figure 11:
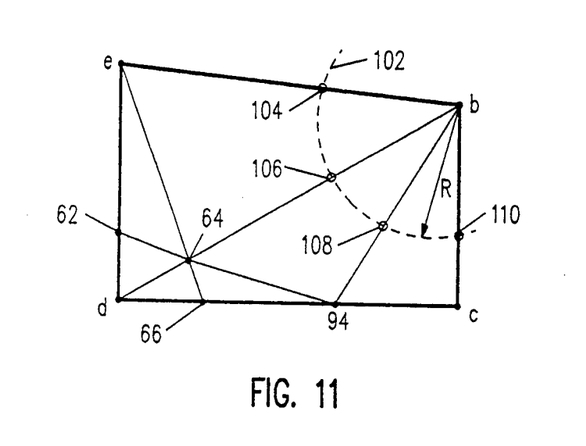
FIG. 11 illustrates how a POI close to a boundary is handled by the method and in addition, shows an additional vertex being considered.

Prior to considering the details of the remaining steps, it is worthwhile to review FIG. 10 where vertex C is now being considered. There, it is to be seen that a new sphere 90 has been constructed, using vertex C as its centerpoint. As a result, a pair of POI's 92 and 94 are determined which, it will be assumed, do not meet the test shown in box 30. However, POI 92, once its sphere 96 is constructed, is found to be within the critical distance of model boundary dc. As a result, (see box 34, FIG. 4) POI 92 is projected onto boundary dc and the revised tetrahedrization appears as shown in FIG. 11.

Each time a new POI is inserted into the tetrahedrization mesh, it is assigned a priority which is one less than the vertex being considered (see box 40 in FIG. 4).

Thus, the method does not consider any newly inserted POI's until it undertakes consideration of vertices having a priority one less than the priority of the vertex which resulted in the placement of the new POI's.

After each new inserted POI is assigned a priority, it is determined whether all POI's for the particular vertex are finished (box 42) and if not, the next point is chosen (box 46) and the program continues. On the other hand, if all POI's for a particular vertex have been considered, then it is determined whether any additional vertices remain to be considered having the same priority (box 44). If yes, a new vertex having the same priority is chosen (box 49) and the program continues.

Once all vertices of a given priority have been considered, the program proceeds to determine whether any vertices remain to be considered (box 48). If vertices remain to be considered, the program then proceeds to box 55 (FIG. 5) where the value of R is incremented by growth factor G. At this point, the next lower priority vertex is selected (box 52), and the program recycles.

Figure 12:
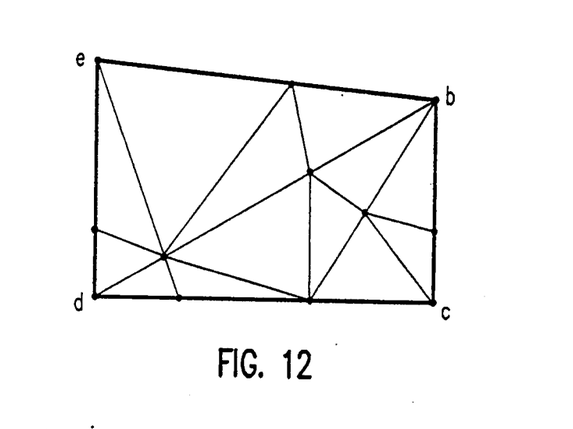
FIG. 12 illustrates the face of the object after new POI's have been selected and inserted.

Turning to FIG. 10 again, it can be seen that the value R for radius 100 is greater than that shown in FIG. 7. This is due to the fact that vertex is assigned a lower priority than vertex d and for that reason, radius R has been incremented in value by growth factor G. Similarly, in FIG. 11, it can be seen that vertex b is assigned the same priority as vertex c so the radius remains the same. As a result, sphere 102 is constructed, allowing POI's 104, 106, 108 and 110 to be determined. As each of those POI's pass the various tests indicated in FIGS. 4 and 5, they are inserted into the mesh and the triangulation shown in FIG. 12 results. The process continues until all vertices have been considered, at which point the point placement action terminates.

Figure 13:
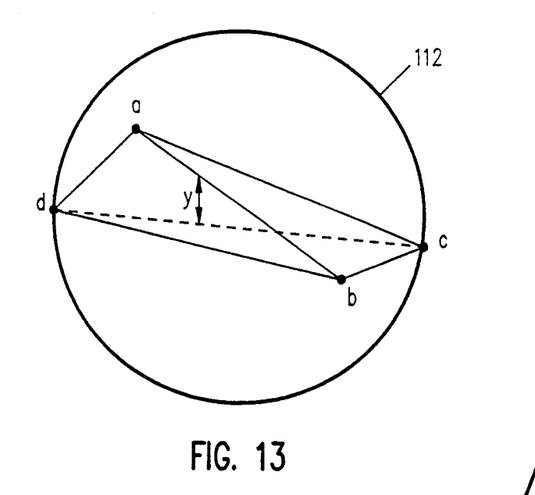
FIG. 13 illustrates a tetrahedron having an undesirable form factor.

Notwithstanding the various tests for choosing POI's to be inserted into the mesh, at times, malformed tetrahedra will result from the process. Turning to FIG. 13, such a malformed tetrahedron is shown. Comparing the tetrahedron of FIG. 13 against that shown in FIG. 2, it can be seen that the FIG. 2 tetrahedron has been "squashed", in that the distance Y between edges a, b and d, c has been greatly reduced. Such a malformed tetrahedron will be hereinafter referred to as a "sliver". The point placement algorithm described above will generally only create slivers of the type shown in FIG. 13. Other types of slivers do not occur because of the clearance tests that prevent the choice of two POI's points that are too closely spaced.

Figure 14:
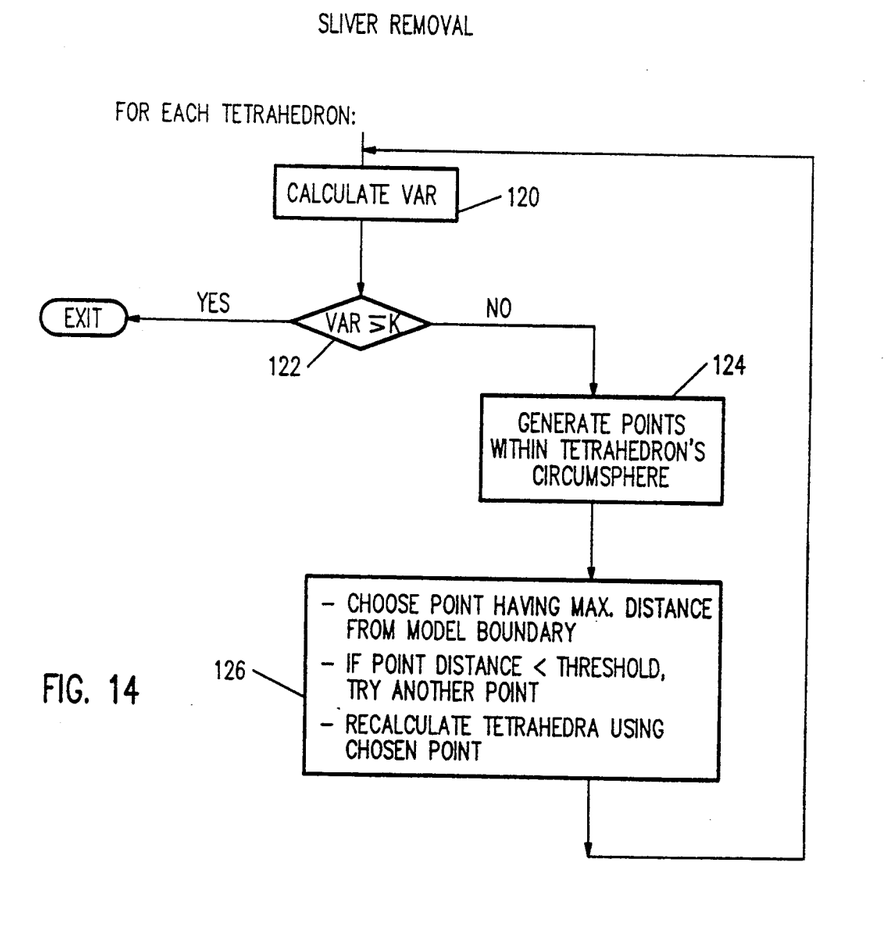
FIG. 14 illustrates a brief high level flow diagram illustrating how such undesirable form factor tetrahedra are modified.

In FIG. 14, a method for revision of sliver tetrahedrons is described. For each tetrahedron that is created by the insertion of new POI's, its volume to area ratio is calculated (box 120). In specific, given a volume V of the tetrahedron and its surface area A (the sum of the areas of the four triangular faces), the volume to area ratio (VAR) is set equal to $$VAR = 374.12 \times V^2 A^3$$

Since the volume and area figures have a different dimensions, the numerator is squared and the denominator is cubed to obtain appropriate dimensional equalities. The range is then normalized from 0 to 1 by multiplying by a fixed constant (approximately 374.12, computed from a regular (i.e., equilateral) tetrahedron.

Since the circumsphere of a Delaunay tetrahedron contains no other points, a malformed tetrahedron can be eliminated by placing a point in its circumsphere. Care must be taken that clearance rules are not violated, also, that new slivers are not created and cause runaway point placement. What follows in FIG. 14 is a heuristic technique used to adjust such a sliver. As shown in decision box 122, if a tetrahedron's VAR is equal to or greater than a constant K, then the tetrahedron is acceptable and the program exits. If the VAR is less than K, the method causes the generation of several points within the tetrahedron's circumsphere (box 124). It is preferred that five candidate points be calculated. The first is the centroid of the tetrahedron which usually provides the best clearance. (The X coordinate of the centroid is the average of the X coordinate of the the four vertices of the tetrahedron and the same for the Y and Z coordinates.)

Occasionally, the centroid will not be a good choice, so four other candidates are tried, one per face of the tetrahedron. The method chooses the point that exhibits a maximum distance from a closest model boundary (box 126). The chosen candidate point is only inserted into the mesh if it's clearance is greater than the threshold value of $R/G^2$. If the candidate point does not meet that test, another one is tried until an appropriate point is determined. To prevent a runaway algorithm, the iterations may be terminated after a preset number have occurred.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for producing a set of points for a mesh of finite elements for a body to be analyzed, said body exhibiting boundaries and faces, said method comprising the steps of:
   a. producing an initial mesh of elements for said body, each said element having a plurality of vertices and edges;
   b. for each vertex in a first subset of said vertices, finding points of intersection (POI's) between a sphere of radius R, centered at said vertex, and said boundaries and edges;
   c. determining if a found POI is either on or within boundaries of said body and if so, exhibits more than a minimum clearance distance from said boundaries and vertices, if both conditions are met, said POI is classified as a selected POI;
   d. inserting a selected POI in said initial mesh; and
   e. repeating steps b-d for all POI in said first subset, and then proceeding to succeeding subsets of said vertices, until all subsets have been considered.

2. The method as recited in claim 1 wherein said method comprises the added step of:
   a1. assigning to each subset of said vertices, a priority value from a range of values spanning from highest to lowest, and performing steps b-e on all vertices in a subset exhibiting a higher assigned priority, before vertices are considered in a subset having a lower assigned priority.

3. The method as recited in claim 2 wherein said method comprises the further step of:
   d1. assigning a priority value to said selected POI which is a next lower priority than the priority value assigned to the subset of which the vertex at the center of said sphere belongs.

4. The method as recited in claim 3 wherein said method comprises the additional step of:
   e1. incrementing the value of radius R to a higher value when said method proceeds to consideration of a next subset of vertices having an assigned lower priority value.

5. The method as recited in claim 4 wherein said method comprises the additional step of:
   c1. for any POI found which is within said boundaries of said body and exhibits more than a minimum clearance distance from other vertices, but not from a boundary, projecting said POI onto said boundary and classifying such POI as a selected POI.

6. The method as recited in claim 4, wherein step (a) comprises the additional step of:
   a2. assigning to a high priority subset of said vertices, any vertex which is close to a neighbor vertex 7. The method as recited in claim 4, wherein step (a) comprises the additional step of:
   a2. assigning to a high priority subset of said vertices, any vertex where a boundary condition is specified.

8. The method as recited in claim 4, wherein step (a) comprises the additional step of:
   a2. assigning to a high priority subset of said vertices, any vertex located at a sharp corner or turn of said body.

9. The method as recited in claim 4 comprising the further step of:
   d2. revising said mesh of elements to include said inserted, selected POI.

10. The method as recited in claim 9 wherein each said element is a tetrahedron, said method comprising the further steps of
    f. calculating a volume to area ratio for each tetrahedron created by step d2; and
    g. adding a point locally to create new tetrahedra having larger volume to area ratio if said calculated volume to area ratio in step f falls below a threshold.

11. The method as recited in claim 10 wherein said added local point falls within a circumsphere surrounding a said tetrahedron.

12. The method as recited in claim 11 wherein said added local point is placed within said circumsphere and at a maximum distance from an adjacent boundary, unless such distance is smaller than a threshold, in which case another local point is selected.

* * * * *